US012270313B2

(12) United States Patent
Lefebvre et al.

(10) Patent No.: US 12,270,313 B2
(45) Date of Patent: Apr. 8, 2025

(54) ENGINE CARCASS STIFFENER FOR HIGH MANEUVER LOADS

(71) Applicant: PRATT & WHITNEY CANADA CORP., Longueuil (CA)

(72) Inventors: Guy Lefebvre, St-Bruno (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/459,939

(22) Filed: Sep. 1, 2023

(65) Prior Publication Data

US 2025/0075638 A1 Mar. 6, 2025

(51) Int. Cl.
*F01D 25/24* (2006.01)

(52) U.S. Cl.
CPC ...... *F01D 25/243* (2013.01); *F05D 2220/323* (2013.01); *F05D 2240/14* (2013.01); *F05D 2260/31* (2013.01); *F05D 2300/175* (2013.01)

(58) Field of Classification Search
CPC ...... F01D 25/243; F01D 25/246; F01D 25/28; F01D 25/265; F05D 2240/14; F05D 2260/31; F16B 5/0241; F16B 5/0258; F16B 19/02
See application file for complete search history.

(56) References Cited

U.S. PATENT DOCUMENTS 2,965,338 A 12/1960 McLean
9,738,392 B2 8/2017 Hellegouarch et al.
10,788,046 B2 9/2020 Colson et al.
11,486,271 B1 * 11/2022 Gajowniczek ............ F02C 7/32
11,746,664 B2 9/2023 Muldoon et al.
12,158,076 B1 12/2024 Demenois et al.
2006/0013681 A1 1/2006 Cardarella, Jr.
(Continued)

FOREIGN PATENT DOCUMENTS

CN 106414241 2/2017
EP 3344544 7/2022
FR 3039824 2/2017

OTHER PUBLICATIONS

European Patent Office, European Search Report dated Jan. 29, 2025 in Application No. 24197744.6.

*Primary Examiner* — David E Sosnowski
*Assistant Examiner* — Maxime M Adjagbe
(74) *Attorney, Agent, or Firm* — SNELL & WILMER L.L.P.

(57) ABSTRACT

An engine carcass stiffener for a turboprop engine is provided. The engine carcass stiffener includes a first longitudinal reinforcement member, a proximal end of the first longitudinal reinforcement member is coupled to a first end of a proximal flange; a second longitudinal reinforcement member, a proximal end of the second longitudinal reinforcement member is coupled to a second end of the proximal flange; a first bushing holder, the first bushing holder is coupled to a first end of a distal flange; a second bushing holder, the second bushing holder is coupled to a second end of the distal flange; a first bolt, the first bolt is inserted through the first bushing holder and couples to a distal end of the first longitudinal reinforcement member; and a second bolt, the second bolt is inserted through the second bushing holder and couples to a distal end of the second longitudinal reinforcement member.

16 Claims, 5 Drawing Sheets

(56) References Cited

U.S. PATENT DOCUMENTS

| | | | | |
|---|---|---|---|---|
| 2012/0195752 | A1 | 8/2012 | Lopez Partida et al. | |
| 2022/0065111 | A1* | 3/2022 | Saboundji ............... | F01D 5/288 |
| 2022/0162964 | A1* | 5/2022 | Kuziemko ............. | B64D 27/40 |
| 2022/0224556 | A1* | 7/2022 | Nakajima ......... | H04L 67/10015 |

* cited by examiner

ENGINE CARCASS STIFFENER FOR HIGH MANEUVER LOADS

FIELD

The present disclosure relates to components turbine engines, and more particularly, an engine carcass stiffener for high maneuver loads driven by the turboprop engine.

BACKGROUND

Gas turbine engines, such as those that power modern commercial and military aircraft, include a compressor section to pressurize a supply of air, a combustor section to burn a fuel in the presence of the pressurized air, and a turbine section to extract energy from the resultant combustion gases to generate thrust. In typical gas turbine engines, such as in a reverse flow combustor, the air supply is received aft of the gas turbine engine, such that the compressor section pressurizes a supply of air received aft of the gas turbine engine, the combustor section burns the fuel in the presence of the pressurized air, the turbine section extracts energy from the resultant combustion gases to generate thrust, and then expel exhaust gas via an exhaust engine carcass that is forward of the gas turbine engine. However, under high maneuver loads, considerable deflection may be experienced in the exhaust engine carcass where the exhaust gases are expelled when under high maneuver loads. Accordingly, improved systems may be beneficial to structurally reinforce and minimize deflection of the exhaust engine carcass.

SUMMARY

An engine carcass stiffener for a turboprop engine is disclosed herein. The engine carcass stiffener includes a proximal flange; a first longitudinal reinforcement member, a proximal end of the first longitudinal reinforcement member is coupled to a first end of the proximal flange; a second longitudinal reinforcement member, a proximal end of the second longitudinal reinforcement member is coupled to a second end of the proximal flange; a distal flange; a first bushing holder, the first bushing holder is coupled to a first end of the distal flange; a second bushing holder, the second bushing holder is coupled to a second end of the distal flange; a first bolt, the first bolt is inserted through the first bushing holder and couples to a distal end of the first longitudinal reinforcement member; and a second bolt, the second bolt is inserted through the second bushing holder and couples to a distal end of the second longitudinal reinforcement member.

In various embodiments, the engine carcass stiffener further includes a first bushing and a second bushing. In various embodiments, the first bushing is fitted into the first bushing holder. In various embodiments, the first bolt is inserted through the first bushing in the first bushing holder. In various embodiments, the second bushing is fitted into the second bushing holder. In various embodiments, the second bolt is inserted through the second bushing in the second bushing holder.

In various embodiments, the engine carcass stiffener further includes a first sliding pin and a second sliding pin. In various embodiments, the first sliding pin is fitted into the first bushing. In various embodiments, the first bolt is inserted through the first sliding pin in the first bushing in the first bushing holder. In various embodiments, the second sliding pin is fitted into the second bushing. In various embodiments, the second bolt is inserted through the second sliding pin in the second bushing in the second bushing holder.

In various embodiments, the distal flange is configured to slide along the first sliding pin and the second sliding pin. In various embodiments, the first sliding pin is longer in length longitudinally than a longitudinal length of the first bushing and the first bushing holder. In various embodiments, the second sliding pin is longer in length longitudinally than a longitudinal length of the second bushing and the second bushing holder.

In various embodiments, the engine carcass stiffener further includes a first cross-support member and a second cross-support member. In various embodiments, a first end of the first cross-support member is coupled to the proximal flange at an area between the radially opposite ends of the proximal flange. In various embodiments, a second end of the first cross-support member is coupled to the first longitudinal reinforcement member at an area between the proximal end and the distal end of the first longitudinal reinforcement member. In various embodiments, a first end of the second cross-support member is coupled to the proximal flange at the area between the radially opposite ends of the proximal flange. In various embodiments, a second end of the second cross-support member is coupled to the second longitudinal reinforcement member at an area between the proximal end and the distal end of the second longitudinal reinforcement member.

In various embodiments, the engine carcass stiffener further includes a first structural support and a second structural support. In various embodiments, the first structural support is coupled to a side of the first bushing holder. In various embodiments, the first structural support is further coupled to the distal flange. In various embodiments, the second structural support is coupled to a side of the second bushing holder. In various embodiments, the second structural support is further coupled to the distal flange.

In various embodiments, the distal end of the first longitudinal reinforcement member comprises female threads configured to receive male threads of the first bolt. In various embodiments, the distal end of the second longitudinal reinforcement member comprises female threads configured to receive male threads of the second bolt.

In various embodiments, the first longitudinal reinforcement member is spaced a distance from the second longitudinal reinforcement member. In various embodiments, the distance is dependent on a diameter of an exhaust port. In various embodiments, the first longitudinal reinforcement member and the second longitudinal reinforcement member are disposed proximate to either side of the exhaust port.

In various embodiments, the engine carcass stiffener is manufactured from a superalloy.

Also disclosed herein is a turboprop engine. The turboprop engine includes an engine carcass stiffener, the engine carcass stiffener includes a proximal flange; a first longitudinal reinforcement member, a proximal end of the first longitudinal reinforcement member is coupled to a first end of the proximal flange; a second longitudinal reinforcement member, a proximal end of the second longitudinal reinforcement member is coupled to a second end of the proximal flange; a distal flange; a first bushing holder, the first bushing holder is coupled to a first end of the distal flange; a second bushing holder, the second bushing holder is coupled to a second end of the distal flange; a first bolt, the first bolt is inserted through the first bushing holder and couples to a distal end of the first longitudinal reinforcement member; and a second bolt, the second bolt is inserted through the second bushing holder and couples to a distal end of the second longitudinal reinforcement member.

In various embodiments, the engine carcass stiffener further includes a first bushing and a second bushing. In various embodiments, the first bushing is fitted into the first bushing holder. In various embodiments, the first bolt is inserted through the first bushing in the first bushing holder. In various embodiments, the second bushing is fitted into the second bushing holder. In various embodiments, the second bolt is inserted through the second bushing in the second bushing holder.

In various embodiments, the engine carcass stiffener further includes a first sliding pin and a second sliding pin. In various embodiments, the first sliding pin is fitted into the first bushing. In various embodiments, the first bolt is inserted through the first sliding pin in the first bushing in the first bushing holder. In various embodiments, the second sliding pin is fitted into the second bushing. In various embodiments, the second bolt is inserted through the second sliding pin in the second bushing in the second bushing holder.

In various embodiments, the distal flange is configured to slide along the first sliding pin and the second sliding pin. In various embodiments, the first sliding pin is longer in length longitudinally than a longitudinal length of the first bushing and the first bushing holder. In various embodiments, the second sliding pin is longer in length longitudinally than a longitudinal length of the second bushing and the second bushing holder.

In various embodiments, the engine carcass stiffener further includes a first cross-support member and a second cross-support member. In various embodiments, a first end of the first cross-support member is coupled to the proximal flange at an area between the radially opposite ends of the proximal flange. In various embodiments, a second end of the first cross-support member is coupled to the first longitudinal reinforcement member at an area between the proximal end and the distal end of the first longitudinal reinforcement member. In various embodiments, a first end of the second cross-support member is coupled to the proximal flange at the area between the radially opposite ends of the proximal flange. In various embodiments, a second end of the second cross-support member is coupled to the second longitudinal reinforcement member at an area between the proximal end and the distal end of the second longitudinal reinforcement member.

In various embodiments, the engine carcass stiffener further includes a first structural support and a second structural support. In various embodiments, the first structural support is coupled to a side of the first bushing holder. In various embodiments, the first structural support is further coupled to the distal flange. In various embodiments, the second structural support is coupled to a side of the second bushing holder. In various embodiments, the second structural support is further coupled to the distal flange.

In various embodiments, the distal end of the first longitudinal reinforcement member comprises female threads configured to receive male threads of the first bolt. In various embodiments, the distal end of the second longitudinal reinforcement member comprises female threads configured to receive male threads of the second bolt.

In various embodiments, the first longitudinal reinforcement member is spaced a distance from the second longitudinal reinforcement member. In various embodiments, the distance is dependent on a diameter of an exhaust port. In various embodiments, the first longitudinal reinforcement member and the second longitudinal reinforcement member are disposed proximate to either side of the exhaust port.

In various embodiments, the engine carcass stiffener is manufactured from a superalloy.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1B:
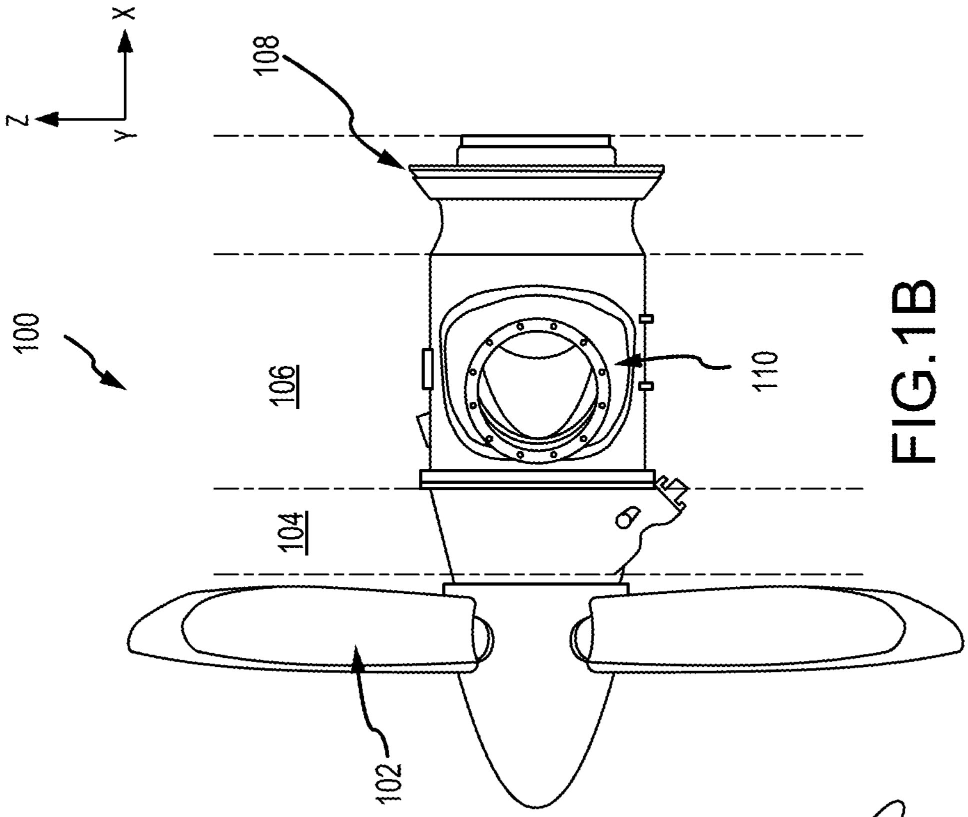
FIGS. 1A and 1B illustrate, a front view, in a y-direction, and a side view, in an x-direction, of a forward portion of a turboprop engine, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion, or to the direction associated with the inlet of the gas turbine engine. As utilized herein, radially inward refers to the negative R direction (towards axis A-A') and radially outward refers to the R direction (away from the A-A' axis). An A-R-C (axial, radial, circumferential) axis is shown in various drawings to illustrate the relative position of various components.

Disclosed herein is an engine carcass stiffener that structurally reinforces and minimizes deflection of the exhaust engine carcass in a turboprop engine. In various embodiments, the engine carcass stiffener may be installed on either side of an exhaust engine carcass, hereinafter referred to as an exhaust engine carcass. In various embodiments, each engine carcass stiffener includes a first section and a second section. In various embodiments, the first section, which may be coupled to an aft portion of the exhaust engine carcass, includes a set of longitudinal reinforcement members, i.e. a first longitudinal reinforcement member and a second longitudinal reinforcement member. In various embodiments, the first longitudinal reinforcement member is spaced, in a z-direction, a distance from the second longitudinal reinforcement member such that the first longitudinal reinforcement member and the second longitudinal reinforcement member are disposed proximate to either side of an exhaust port that protrudes through a portion of the exhaust engine carcass. In various embodiments, the first section includes a proximal flange that couples to a proximal flange of the exhaust engine carcass, the proximal flange of the exhaust engine carcass further coupled to a distal flange of a gas generator case. In various embodiments, a proximal end of each of the first longitudinal reinforcement member and the second longitudinal reinforcement member couple to the proximal flange of the first section at radially opposite ends, in the z-direction, of the proximal flange of the first section. In various embodiments, the first section further includes a set of cross-support members. In various embodiments, a first end of each of the cross-support members are coupled to the proximal flange of the first section at an area between the radially opposite ends of the proximal flange of the first section and are respectively coupled to an area of the first longitudinal reinforcement member or the second longitudinal reinforcement member between the proximal end and the distal end of the first longitudinal reinforcement member or the second longitudinal reinforcement member.

In various embodiments, the second section of the engine carcass stiffener includes a distal flange that couples to a distal flange of the exhaust engine carcass, the distal flange of the exhaust engine carcass further coupled to a proximal flange of the gear box. In various embodiments, the distal flange of the second section includes a set of bushing holders, which each have a tubular shape with a void in the center in order to receive a bushing. In various embodiments, the bushing holders are disposed at radially opposite ends of the distal flange of the second section. In various embodiments, each of the set of bushing holders may be structurally supported and affixed to the distal flange of the second section by a support that is coupled to a side of the bushing holder and coupled to the distal flange of the second section. In various embodiments, a respective bushing may be disposed within each of the set of bushing holders. In various embodiments, the distal flange of the second section may be coupled to the distal ends of the set of longitudinal reinforcement members via a respective bolt that is fitted into a respective sliding pin that is fitted into a respective bushing within a respective bushing holder. In that regard, in various embodiments, each distal end of the set of longitudinal reinforcement members includes a female threaded portion so as to receive the male threaded portion of a respective bolt. In various embodiments, each sliding pin is longer in length longitudinally than a longitudinal length of the respective bushing and bushing holder into which the sliding pin is fitted. In that regard, in various embodiments, once the respective bolt is tightened into a respective one of the set of longitudinal reinforcement members with the respective sliding pin positioned between the head of the bolt and the distal end of the respective one of the set of longitudinal reinforcement members, the distal flange of the second section is configured to slide in an axial direction, i.e. in the x-direction, along a respective sliding pin. In that regard, responsive to an axial expansion of the exhaust engine carcass that may occur when the exhaust engine carcass heats up during operation, the second section of the engine carcass stiffener slides along the sliding pins while providing structurally reinforcement and minimizing deflection of the exhaust engine carcass.

Figure 1A:
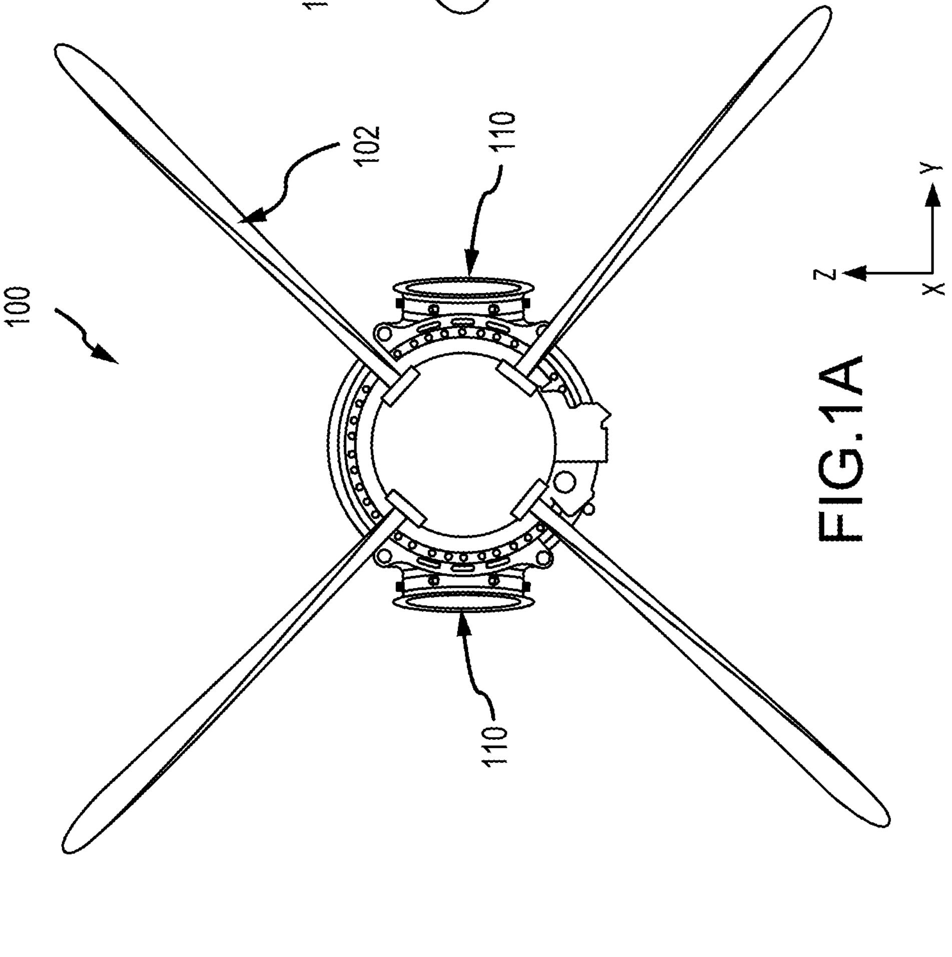

With reference to FIGS. 1A and 1B, a front view, in a y-direction, and a side view, in an x-direction, of a forward portion of a turboprop engine 100 is illustrated, in accordance with various embodiments. In various embodiments, the turboprop engine 100 generally includes a propeller 102, a gear box section 104, an exhaust engine carcass 106, and a gas generator casing 108. In various embodiments, the exhaust engine carcass 106 includes a set of exhaust ports 110 disposed on either side, in a y-direction, of the exhaust engine carcass 106.

Figure 2:
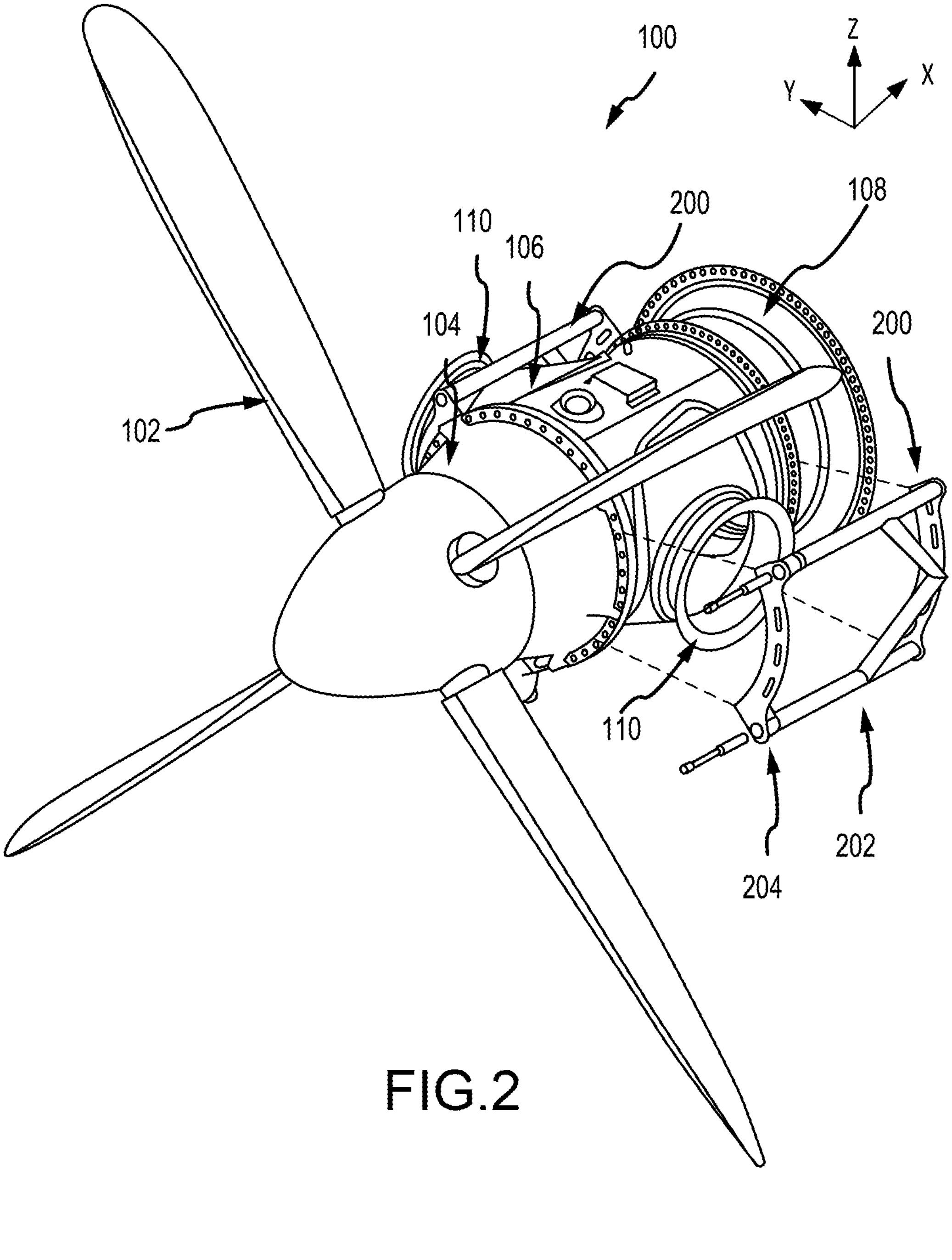
FIG. 2 illustrates an isometric view of a turboprop engine onto which a set of engine carcass stiffeners are affixed, in accordance with various embodiment.

Referring to FIG. 2, an isometric view of a turboprop engine 100 onto which a set of engine carcass stiffeners 200 are affixed is illustrated, in accordance with various embodiments. In various embodiments, the turboprop engine 100 generally includes the propeller 102, the gear box section 104, the exhaust engine carcass 106, and the gas generator casing 108. In various embodiments, the exhaust engine carcass 106 includes the set of exhaust ports 110 disposed on either side, in a y-direction, of the exhaust engine carcass 106. In various embodiments, during operation of the turboprop engine 100, various maneuvers, may cause deflection in at least the exhaust engine carcass 106 due to the structure of the exhaust engine carcass 106. In that regard, in various embodiments, the engine carcass stiffeners 200 are added to either side of the exhaust engine carcass 106 to structurally reinforce and tend to minimize deflection of the exhaust engine carcass 106, i.e. an exhaust engine carcass, of the turboprop engine 100. In various embodiments, the engine carcass stiffener 200 includes a first section 202 and a second section 204. In various embodiments, the first section 202 includes a proximal flange that couples to a proximal flange of the exhaust engine carcass 106, the proximal flange of the exhaust engine carcass 106 further coupled to a distal flange of a gas generator casing 108. In various embodiments, the second section 204 includes a distal flange that couples to a distal flange of the exhaust engine carcass 106, the distal flange of the exhaust engine carcass 106 further coupled to a proximal flange of the gear box section 104. In various embodiments, the first section 202 is then coupled to the second section 204.

Figure 3:
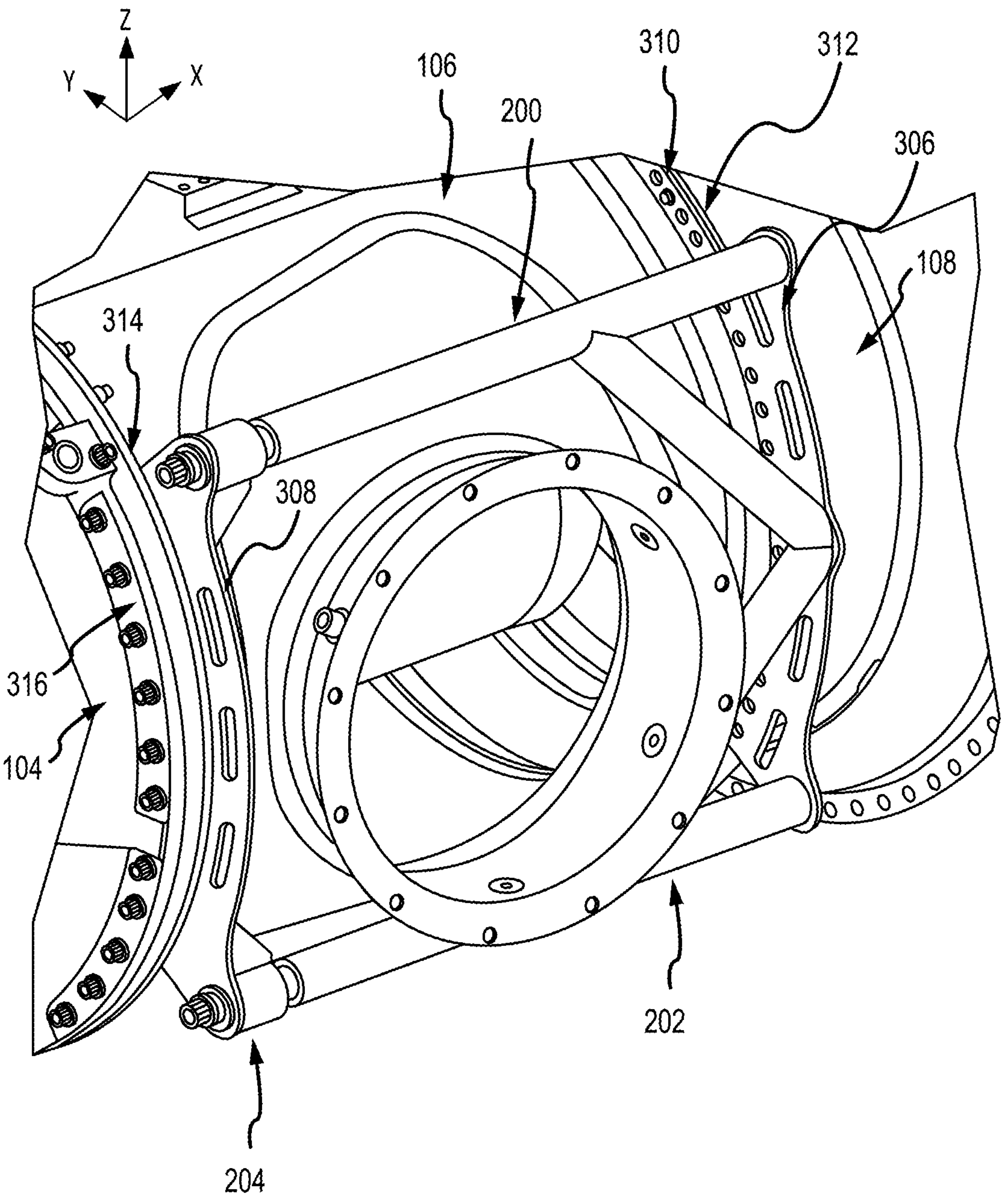
FIG. 3 illustrates an isometric view of an exhaust engine carcass of a turboprop engine onto which a set of engine carcass stiffeners are affixed, in accordance with various embodiments.

Referring to FIG. 3, an isometric view of the exhaust engine carcass 106 of the turboprop engine 100 onto which a set of engine carcass stiffeners 200 are affixed is illustrated, in accordance with various embodiments. As described previously, in various embodiments, an engine carcass stiffener 200 includes the first section 202 and the second section 204. In various embodiments, the first section 202 includes a proximal flange 306 that couples to a proximal flange 310 of the exhaust engine carcass 106, the proximal flange 310 of the exhaust engine carcass 106 further coupled to a distal flange 312 of the gas generator casing 108. In various embodiments, the second section 204 includes a distal flange 308 that that couples to a distal flange 314 of the exhaust engine carcass 106, the distal flange 314 of the exhaust engine carcass 106 further coupled to a proximal flange 316 of the gear box section 104. In various embodiments, the first section 202 is then coupled to the second section 204.

Figure 4:
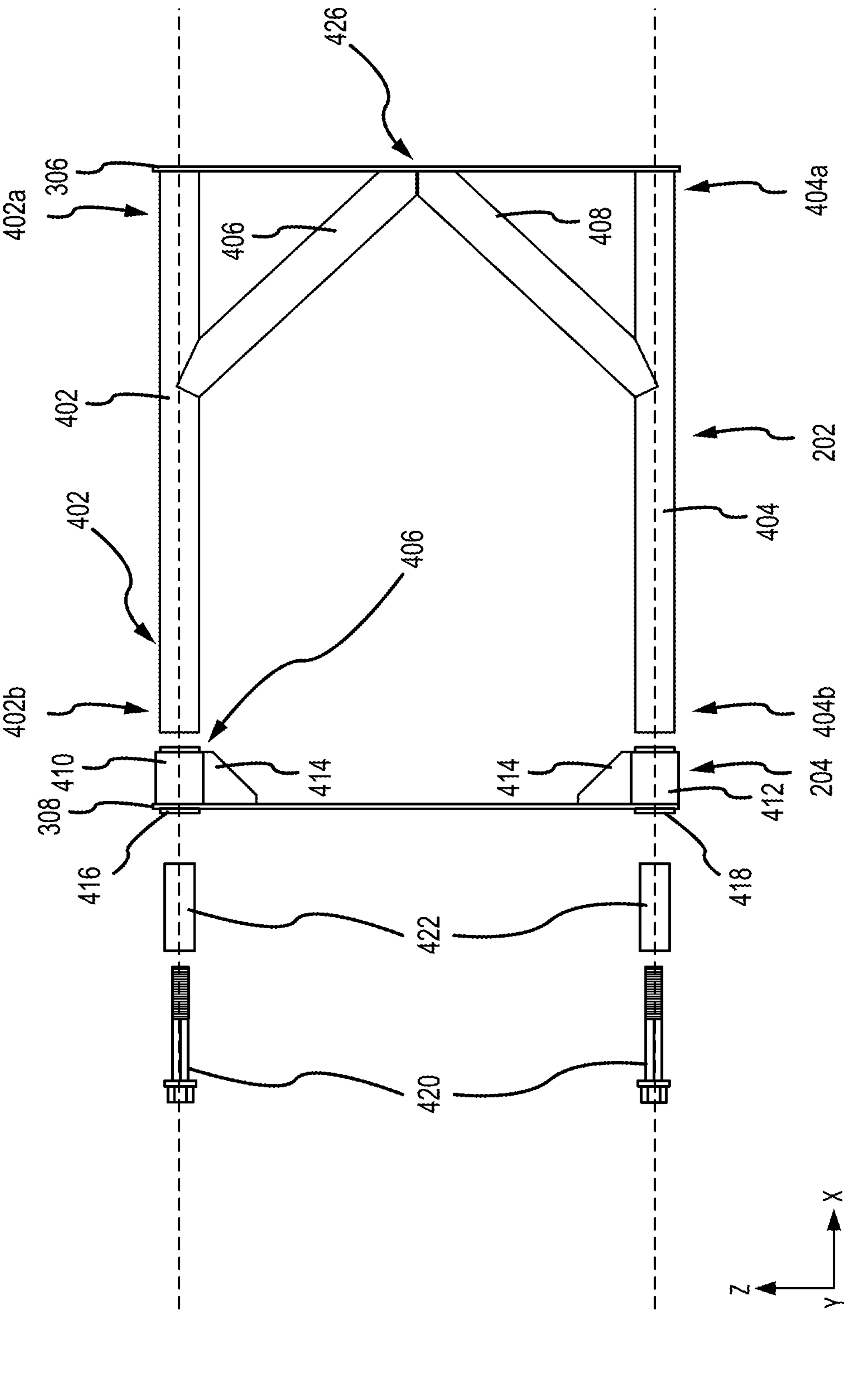
FIG. 4 illustrates an exploded side view of an engine carcass stiffener, in accordance with various embodiments.

Referring to FIG. 4, an exploded side view of an engine carcass stiffener 200 is illustrated, in accordance with various embodiments. In various embodiments, each engine carcass stiffener 200 includes the first section 202 and a second section 204. In various embodiments, the first section includes a set of longitudinal reinforcement members 402, 404, i.e. a first longitudinal reinforcement member 402 and a second longitudinal reinforcement member 404. In various embodiments, the first longitudinal reinforcement member 402 is spaced, in a z-direction, a distance from the second longitudinal reinforcement member 404 such that the first longitudinal reinforcement member 402 and the second longitudinal reinforcement member 404 are disposed proximate to either side of an exhaust ports that protrudes through a portion of the exhaust engine carcass as illustrated in FIGS. 2 and 3. In various embodiments, the first section 202 includes a proximal flange 306 that couples to a proximal flange of the exhaust engine carcass. In various embodiments, proximal end 402*a*, 404*a* of each of the first longitudinal reinforcement member 402 and the second longitudinal reinforcement member 404 couple to the proximal flange 306 at radially opposite ends, in the z-direction, of the proximal flange 306. In various embodiments, the first section 202 further includes a set of cross-support members 406, 408. In various embodiments, a first end of each of the cross-support members 406, 408 are coupled at a first end to the proximal flange 306 at an area 426 between the radially opposite ends of the proximal flange 306. In various embodiments, set of cross-support members 406, 408 are further respectively coupled at a second end to an area of the first longitudinal reinforcement member 402 or the second longitudinal reinforcement member 404 between the proximal end 402*a*, 404*a* and the distal end 402*b*, 404*b* of the first longitudinal reinforcement member 402 or the second longitudinal reinforcement member 404. In various embodiments, the cross-support members 406, 408 may be replaced with a cross-member that couples to an area of the first longitudinal reinforcement member 402 and the second longitudinal reinforcement member 404 between the proximal end 402*a*, 404*a* and the distal end 402*b*, 404*b* of the first longitudinal reinforcement member 402 and the second longitudinal reinforcement member 404 and further curves around the exhaust port. In various embodiments, the cross-support members 406, 408 may be replaced with a plate that couples to the proximal area of the first longitudinal reinforcement member 402 and the second longitudinal reinforcement member 404 as well as the proximal flange 306 and further curves around the exhaust port.

In various embodiments, the second section 204 of the engine carcass stiffener includes a distal flange 308 that couples to a distal flange of the exhaust engine carcass. In various embodiments, the distal flange 308 includes a set of bushing holders 410, 412, i.e. a first bushing holder 410 and a second bushing holder 412. In various embodiments, the of bushing holders 410, 412 each have a tubular shape in order to receive a bushing. In various embodiments, each bushing holder 410, 412 is disposed at and coupled to radially opposite ends of the distal flange 308. In various embodiments, each of the set of bushing holders 410, 412 may be structurally supported and affixed to the distal flange 308 by a structural support 414 that is coupled to a side of the bushing holder 410 or 412 and coupled to the distal flange 308. In various embodiments, structural support may be a piece of metal with a defined thickness that is triangular or square, among others in shape that may be welded, or otherwise affixed to a side of the bushing holder 410 or 412 and coupled to the distal flange 308. In various embodiments, a respective bushing 416, 418 may be disposed within each of the set of bushing holders 410, 412. In various embodiments, the distal flange 308 may be coupled to the distal ends 402*b*, 404*b* of the set of longitudinal reinforcement members 402, 404 via a respective bolt 420 that is fitted into a respective sliding pin 422 that is fitted into a respective bushing 416, 418. In that regard, in various embodiments, each distal end 402*b*, 404*b* of the set of longitudinal reinforcement members 402, 404 includes a female threaded portion so as to receive the male threaded portion of a respective bolt 420.

In various embodiments, each sliding pin 422 is longer in length longitudinally than a longitudinal length of the respective bushing 416, 418 and bushing holder 410, 412 into which the sliding pin 422 is fitted. In that regard, in various embodiments, once the respective bolt 420 is inserted through a respective bushing 416, 418 and bushing holder 410, 412 and tightened into a respective distal end 402*b*, 404*b* of the set of longitudinal reinforcement members 402, 404 with the respective sliding pin 422 positioned between the head of the bolt 420 and the respective distal end 402*b*, 404*b* of the set of longitudinal reinforcement members 402, 404, the distal flange 308 of the second section 204 is configured to slide in an axial direction, i.e. in the x-direction, along a respective sliding pin 422. In that regard, responsive to an axial expansion of the exhaust engine carcass that may occur when the exhaust engine carcass heats up during operation, the second section 204 of the engine carcass stiffener 200 slides along the sliding pins 422 while providing structurally reinforcement and minimizing deflection of the exhaust engine carcass. In various embodiments, the various components of the engine carcass stiffener 200 may be manufactured from nickel-chromium alloy 625 (a nickel-based superalloy), nickel alloy 718 (a nickel-based superalloy), waspaloy (a nickel-based, age hardenable superalloy), Haynes® 282® (a nickel-chromium-cobalt superalloy), or other superalloy, among others, that each have high strength, excellent fabricability (including joining), and outstanding corrosion resistance. In various embodiments, the set of longitudinal reinforcement members 402, 404 and the set of cross-support members 406, 408 may be tubular shaped, square shaped, or "L" shaped, among others, with a round, square, or "L" shaped outer surface, among others.

Figure 5:
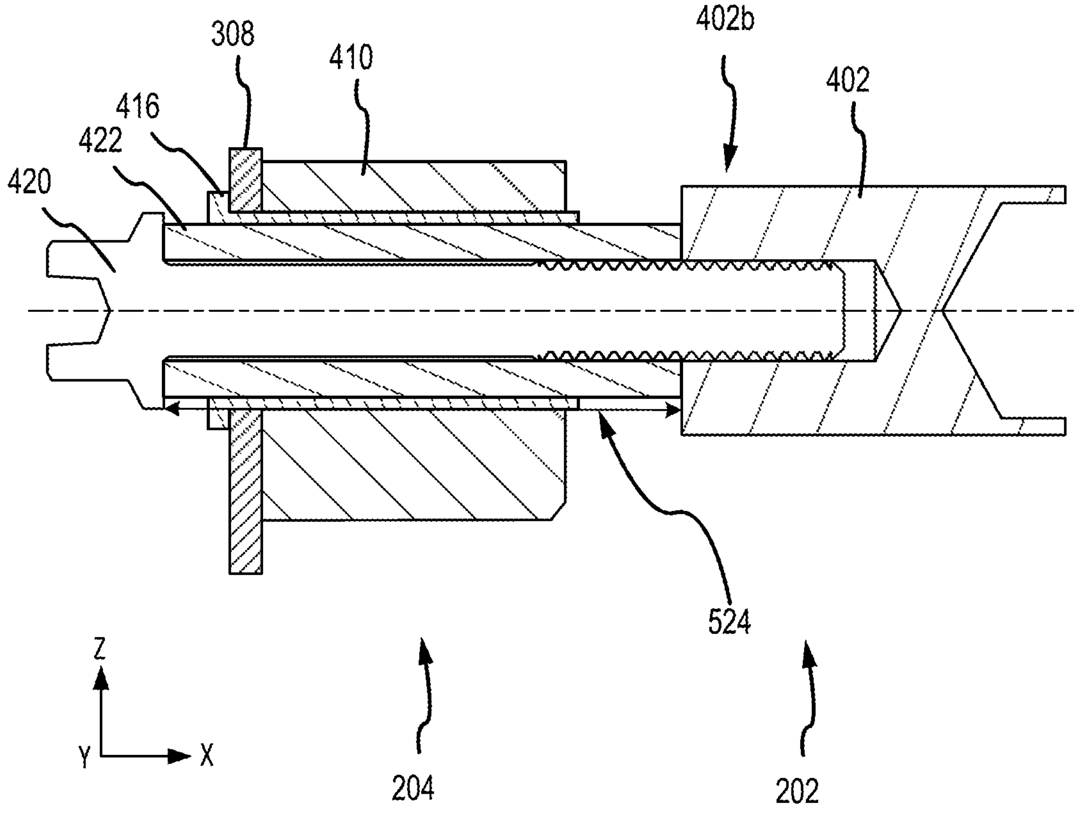
FIG. 5 illustrates a cross-sectional view of a coupling of a first section to the second section of an engine carcass stiffener, in accordance with various embodiments.

Referring to FIG. 5, a cross-sectional view of a coupling of a first section 202 to a second section 204 of an engine carcass stiffener 200 is illustrated, in accordance with various embodiments. In various embodiments, the distal flange 308 may be coupled to the distal ends 402*b* of the first longitudinal reinforcement member 402 via a respective bolt 420 that is fitted into sliding pin 422 that is fitted into the bushing 416 within the bushing holder 410. In that regard, in various embodiments, the distal end 402*b* of the first longitudinal reinforcement member 402 includes a female threaded portion so as to receive the male threaded portion of a respective bolt 420. In various embodiments, the sliding pin 422 is longer in length longitudinally than a longitudinal length of the bushing 416 and bushing holder 410 into which the sliding pin 422 is fitted. In that regard, in various embodiments, once the bolt 420 is tightened into the distal end 402*b* of the first longitudinal reinforcement member 402 with the sliding pin 422 positioned between the head of the bolt 420 and the distal end 402*b* of the first longitudinal reinforcement member 402, the distal flange 308 is configured to slide in an axial direction, i.e. in the x-direction, along the sliding pin 422. In that regard, responsive to an axial expansion of the exhaust engine carcass that may occur when the exhaust engine carcass heats up during operation, the second section 204 of the engine carcass stiffener slides along the sliding pin 422 while providing structural reinforcement and tending to minimize deflection of the exhaust engine carcass.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine carcass stiffener for a turboprop engine comprising:

a proximal flange;

a first longitudinal reinforcement member, wherein a proximal end of the first longitudinal reinforcement member is coupled to a first end of the proximal flange;

a second longitudinal reinforcement member, wherein a proximal end of the second longitudinal reinforcement member is coupled to a second end of the proximal flange;

a distal flange;

a first bushing holder, wherein the first bushing holder is coupled to a first end of the distal flange;

a second bushing holder, wherein the second bushing holder is coupled to a second end of the distal flange;

a first bolt, wherein the first bolt is inserted through the first bushing holder and couples to a distal end of the first longitudinal reinforcement member;

a second bolt, wherein the second bolt is inserted through the second bushing holder and couples to a distal end of the second longitudinal reinforcement member;

a first bushing, wherein the first bushing is fitted into the first bushing holder and wherein the first bolt is inserted through the first bushing in the first bushing holder;

a second bushing, wherein the second bushing is fitted into the second bushing holder and wherein the second bolt is inserted through the second bushing in the second bushing holder;

a first sliding pin, wherein the first sliding pin is fitted into the first bushing and wherein the first bolt is inserted through the first sliding pin in the first bushing in the first bushing holder; and a second sliding pin, wherein the second sliding pin is fitted into the second bushing and wherein the second bolt is inserted through the second sliding pin in the second bushing in the second bushing holder.

2. The engine carcass stiffener of claim 1, wherein the distal flange is configured to slide along the first sliding pin and the second sliding pin.

3. The engine carcass stiffener of claim 2, wherein the first sliding pin is longer in length longitudinally than a longitudinal length of the first bushing and the first bushing holder and wherein the second sliding pin is longer in length longitudinally than a longitudinal length of the second bushing and the second bushing holder.

4. The engine carcass stiffener of claim 1, further comprising:

a first cross-support member, wherein a first end of the first cross-support member is coupled to the proximal flange at an area between the radially opposite ends of the proximal flange and wherein a second end of the first cross-support member is coupled to the first longitudinal reinforcement member at an area between the proximal end and the distal end of the first longitudinal reinforcement member; and a second cross-support member, wherein a first end of the second cross-support member is coupled to the proximal flange at the area between the radially opposite ends of the proximal flange and wherein a second end of the second cross-support member is coupled to the second longitudinal reinforcement member at an area between the proximal end and the distal end of the second longitudinal reinforcement member.

5. The engine carcass stiffener of claim 1, further comprising:

a first structural support, wherein the first structural support is coupled to a side of the first bushing holder and wherein the first structural support is further coupled to the distal flange; and a second structural support, wherein the second structural support is coupled to a side of the second bushing holder and wherein the second structural support is further coupled to the distal flange.

6. The engine carcass stiffener of claim 1, wherein the distal end of the first longitudinal reinforcement member comprises female threads configured to receive male threads of the first bolt and wherein the distal end of the second longitudinal reinforcement member comprises female threads configured to receive male threads of the second bolt.

7. The engine carcass stiffener of claim 1, wherein the first longitudinal reinforcement member is spaced a distance from the second longitudinal reinforcement member and wherein the distance is dependent on a diameter of an exhaust port and wherein the first longitudinal reinforcement member and the second longitudinal reinforcement member are disposed proximate to either side of the exhaust port.

8. The engine carcass stiffener of claim 1, wherein the engine carcass stiffener is manufactured from a superalloy.

9. A turboprop engine comprising:

an engine carcass stiffener, the engine carcass stiffener comprising:

a proximal flange;

a first longitudinal reinforcement member, wherein a proximal end of the first longitudinal reinforcement member is coupled to a first end of the proximal flange;

a second longitudinal reinforcement member, wherein a proximal end of the second longitudinal reinforcement member is coupled to a second end of the proximal flange;

a distal flange;

a first bushing holder, wherein the first bushing holder is coupled to a first end of the distal flange;

a second bushing holder, wherein the second bushing holder is coupled to a second end of the distal flange;

a first bolt, wherein the first bolt is inserted through the first bushing holder and couples to a distal end of the first longitudinal reinforcement member;

a second bolt, wherein the second bolt is inserted through the second bushing holder and couples to a distal end of the second longitudinal reinforcement member;

a first bushing, wherein the first bushing is fitted into the first bushing holder and wherein the first bolt is inserted through the first bushing in the first bushing holder;

a second bushing, wherein the second bushing is fitted into the second bushing holder and wherein the second bolt is inserted through the second bushing in the second bushing holder;

a first sliding pin, wherein the first sliding pin is fitted into the first bushing and wherein the first bolt is inserted through the first sliding pin in the first bushing in the first bushing holder; and a second sliding pin, wherein the second sliding pin is fitted into the second bushing and wherein the second bolt is inserted through the second sliding pin in the second bushing in the second bushing holder.

10. The turboprop engine of claim 9, wherein the distal flange is configured to slide along the first sliding pin and the second sliding pin.

11. The turboprop engine of claim 10, wherein the first sliding pin is longer in length longitudinally than a longitudinal length of the first bushing and the first bushing holder and wherein the second sliding pin is longer in length longitudinally than a longitudinal length of the second bushing and the second bushing holder.

12. The turboprop engine of claim 9, wherein the engine carcass stiffener further comprises:

a first cross-support member, wherein a first end of the first cross-support member is coupled to the proximal flange at an area between the radially opposite ends of the proximal flange and wherein a second end of the first cross-support member is coupled to the first longitudinal reinforcement member at an area between the proximal end and the distal end of the first longitudinal reinforcement member; and a second cross-support member, wherein a first end of the second cross-support member is coupled to the proximal flange at the area between the radially opposite ends of the proximal flange and wherein a second end of the second cross-support member is coupled to the second longitudinal reinforcement member at an area between the proximal end and the distal end of the second longitudinal reinforcement member.

13. The turboprop engine of claim 9, wherein the engine carcass stiffener further comprises:

a first structural support, wherein the first structural support is coupled to a side of the first bushing holder and wherein the first structural support is further coupled to the distal flange; and a second structural support, wherein the second structural support is coupled to a side of the second bushing holder and wherein the second structural support is further coupled to the distal flange.

14. The turboprop engine of claim 9, wherein the distal end of the first longitudinal reinforcement member comprises female threads configured to receive male threads of the first bolt and wherein the distal end of the second longitudinal reinforcement member comprises female threads configured to receive male threads of the second bolt.

15. The turboprop engine of claim 9, wherein the first longitudinal reinforcement member is spaced a distance from the second longitudinal reinforcement member and wherein the distance is dependent on a diameter of an exhaust port and wherein the first longitudinal reinforcement member and the second longitudinal reinforcement member are disposed proximate to either side of the exhaust port.

16. The turboprop engine of claim 9, wherein the engine carcass stiffener is manufactured from a superalloy.

* * * * *